US006499506B2

(12) United States Patent
Feiner

(10) Patent No.: US 6,499,506 B2
(45) Date of Patent: Dec. 31, 2002

(54) VACUUM DISTRIBUTION CONTROLLER APPARATUS

(75) Inventor: David Feiner, Ra'anana (IL)

(73) Assignee: Aprion Digital Ltd., Netanya (IL)

(*) Notice: Subject to any disclaimer, the term of this patent is extended or adjusted under 35 U.S.C. 154(b) by 0 days.

(21) Appl. No.: 09/817,239

(22) Filed: Mar. 27, 2001

(65) Prior Publication Data

US 2002/0139424 A1 Oct. 3, 2002

(51) Int. Cl.[7] .......... F16K 11/065
(52) U.S. Cl. .......... 137/625.11; 137/625.12; 269/21
(58) Field of Search .......... 137/625.11, 625.12; 269/21; 251/270

(56) References Cited

U.S. PATENT DOCUMENTS

| | | | | | |
|---|---|---|---|---|---|
| 677,085 | A | * | 6/1901 | Johnson | 251/270 |
| 871,320 | A | * | 11/1907 | Bollee | 137/625.12 X |
| 1,293,840 | A | * | 2/1919 | McLeod et al. | 251/270 |
| 1,354,580 | A | * | 10/1920 | Schumacher | 137/625.12 |
| 2,318,964 | A | * | 5/1943 | Parker | 251/270 |
| 2,572,640 | A | * | 10/1951 | Lovegrove | 137/625.12 X |
| 3,115,159 | A | * | 12/1963 | Yasui | 137/625.12 X |
| 3,162,210 | A | * | 12/1964 | Bemis | 137/625.11 X |
| 3,408,031 | A | * | 10/1968 | Muir, Jr. | 269/21 X |
| 4,392,915 | A | * | 7/1983 | Zajac | 269/21 X |
| 4,468,017 | A | | 8/1984 | Pavone | |
| 4,768,763 | A | * | 9/1988 | Gerber | 269/21 |
| 4,934,670 | A | * | 6/1990 | Witte | 269/21 X |
| RE33,782 | E | * | 12/1991 | Fujita et al. | 251/129.11 |
| 5,226,451 | A | * | 7/1993 | Brumfield | 137/625.11 |
| 6,336,492 | B1 | * | 1/2002 | Nagaoka | 269/21 X |

* cited by examiner

*Primary Examiner*—John Rivell
(74) *Attorney, Agent, or Firm*—Eitan, Pearl, Latzer & Cohen-Zedek

(57) ABSTRACT

A vacuum suction force control apparatus is disclosed by way of a duct, having an entrance port and at least one exit port. Flow of suction force is controlled by moving a piston-like plunger inside the duct, connecting the entrance port to one, or simultaneously, multiple, adjacent exit ports. The present invention achieves known vacuum distribution without utilizing prior art electromechanical vacuum valves and associated electrical control cabling and power supply equipment. Therefore, the present invention is inherently capable of maintaining a particular, temporary distribution configuration without requiring electrical nor mechanical energy.

14 Claims, 5 Drawing Sheets

VACUUM DISTRIBUTION CONTROLLER APPARATUS

FIELD OF THE INVENTION

The present invention relates to devices for temporarily affixing objects utilizing vacuum and in particular to a vacuum distribution manifold apparatus for vacuum tables.

BACKGROUND OF THE INVENTION

Surfaces capable of affixing an object by vacuum are commonly known as vacuum tables. Prior art vacuum tables commonly have a predetermined perforated region through which maximum vacuum suction force typically is applied to an object that covers at least the predetermined perforated region. The suction force is usually generated by a vacuum pump system. The object becomes thus affixed to the surface while the suction force or vacuum is enabled. Suction force is lost through holes not covered by the object, and thus many techniques have been employed in the prior art to overcome this problem.

One possible solution is to utilize a suction force controlling device such as a Coanda-Effect operated diaphragm device, or a differential pressure valve. This is an inherently costly solution, since one such device is needed for each of the numerous holes of a vacuum table.

Another simple and effective solution is to cover any uncovered region with masks of various shapes. In mass manufacturing processes the objects usually has a constant size, and a custom made mask is therefore commonly utilized.

Another solution is to divide the perforated region into a number of smaller areas so that suction-force can be occluded from those areas not in contact with or covered by the object. Vacuum valves operated by electrically controlled solenoids are widely utilized in industrial vacuum table applications.

It should be noted here that, for ease of understanding the prior art predicaments, the following discussion relates to FIGS. 1A and 1B, illustrations of a 5-area addressable vacuum table. Persons versed in the art will readily appreciated that, for each addressable area, substantially identical subsystems need to be employed.

FIG. 1A is a schematic view of a prior art vacuum table system configuration for directing suction-force to multiple addressable areas 100 of a vacuum table 102. A vacuum pump 104 is coupled to a manifold 106 comprising a predetermined number (2, 3, or more) of ports 108. Each port 108 is coupled to a respective area suction inlet port 110 via a suitable tubing 112. To independently control suction-force to each area 100, each tubing 112 is equipped with an individual shut-off tap 114.

All shut-off taps 114, except a shut-off tap 128, are activated or, deactivated by a vacuum distribution control system 124, thus inhibiting flow of suction force to all undesired areas 100 and enabling all available suction force to a predetermined area 126.

FIG. 1B shows a more detailed schematic view of individual shut-off tap 114, comprising two main components, a vacuum valve 118 and a solenoid 120. Suction force is either allowed to or inhibited from traversing vacuum valve 118 by activating or by deactivating solenoid 120. Solenoid 120, receives an activate/deactivate signal 122 from vacuum distribution control 124 (best seen in FIG. 1A) or any other suitable subsystem.

To achieve a highly precise dimensioning of an active suction area, a substantial number of addressable, small areas need to be controlled by an equal number of manifold ports, tubing, shut-off taps with accompanying devices, electrical control cabling, etc.

Thus, a substantial number of mechanical, electromechanical, power supply, and electrical control devices are needed in order to perform the task of directing suction force to a few areas of the vacuum table. Those versed in the art will readily appreciate that this can result in a multitude of potential sources of malfunctioning.

There is, accordingly, a need in the art for a novel technique for improved suction force directing means, directable in a variable way to a multitude of areas.

BRIEF DESCRIPTION OF THE DRAWINGS

In order to understand the invention and to see how it may be carried out in practice, a detailed description follows, by way of non-limiting examples only, with reference to the accompanying drawings, in which.

DETAILED DESCRIPTION

The present invention provides flow control by way of a duct, having an entrance port and at least one exit port. The flow of a fluid or gaseous substance is controlled by moving a piston-like plunger inside the duct, connecting the entrance port to one, or simultaneously, multiple, adjacent exit ports. The present invention achieves known vacuum distribution without utilizing prior art electromechanical vacuum valves and associated electrical control cabling and power supply equipment. Therefore, the present invention is inherently capable of maintaining a particular, temporary distribution configuration, without requiring neither electrical nor mechanical energy. Further advantages will become evident in the description and embodiments described below.

Those versed in the art will readily appreciate that the invention is by no means limited to the herein discussed particular examples and furthermore, a multitude of applications in other fields such as, inter alia, fluid and gaseous flow control, may equally and advantageously utilize the present invention and embodiments as discussed in the description.

Figure 2:
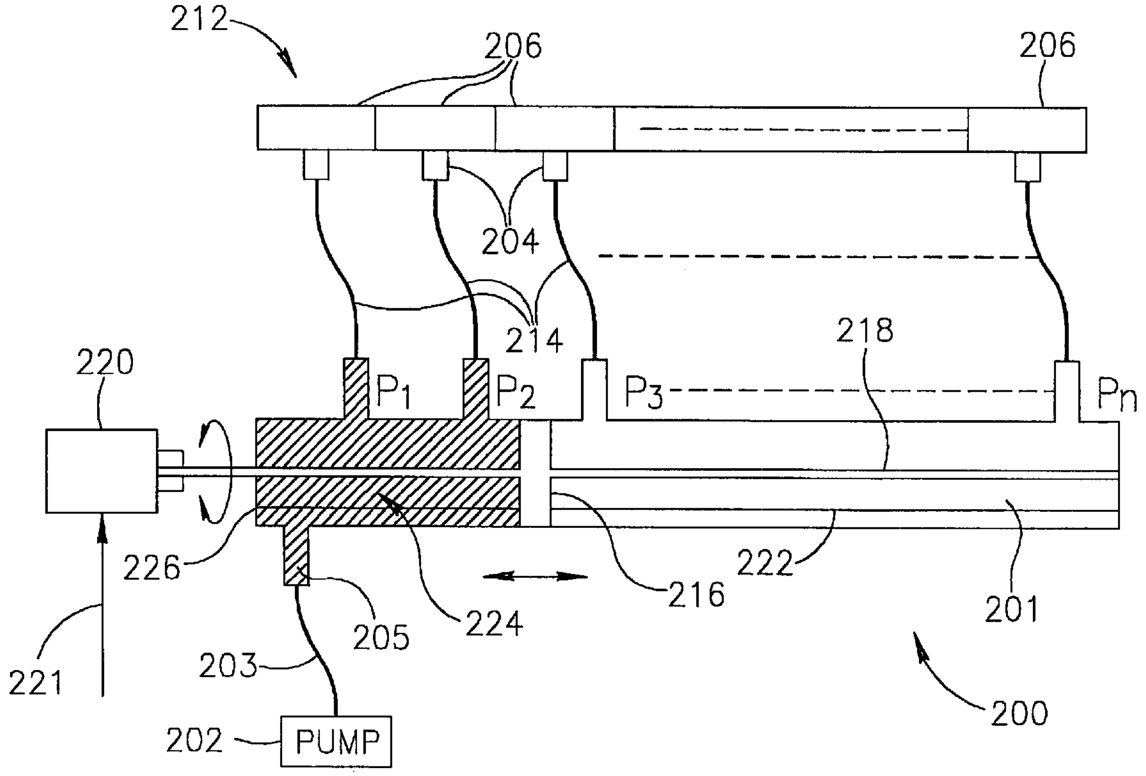
FIG. 2 is a schematic representation of the vacuum distribution controller in accordance with an embodiment of the present invention.

Reference is now made to FIG. 2, a schematic illustration of a vacuum table 212 and a vacuum distribution controller apparatus 200, constructed and operated in accordance with an embodiment of the present invention: a duct 201, preferably, cylindrical, is coupled to a vacuum suction force source or pump 202 via a suitable tubing 203. Duct 201 is closed at both peripheral ends and comprises an entrance port 205 and a multitude of exit ports $P_1$, $P_2$, $P_3$, . . . $P_n$. Each exit port $P_1$, $P_2$, $P_3$, . . . $P_n$ is coupled via an associated suitable tubing 214 respectively, to a multitude of vacuum suction inlet ports 204 of a multitude of suction areas 206.

Duct 201 may be part of a housing of any applicable shape, as to be discussed in more detail below. Duct 201 is effectively a close-fitting sleeve for a plunger 216. Plunger 216 may be a disc or a piston, but it is noted here that, plunger 216 may have any shape that is configured to closely fit inside duct 201.

A worm gear 218 may be positioned in the center of duct 201. A motor 220 rotates worm gear 218 in either clockwise- or counterclockwise directions. In one embodiment of the present invention, motor 220 may be a stepper motor, which rotation movement is responsive to an electrical signal 221, comprising a predefined number of electrical pulses outputted by a stepper motor controller (not shown).

Optionally, other devices, such as inter alia, a linear motor, may be utilized for moving plunger 216, whereby worm gear 218 is replaced by a shaft, which is moved by the linear motor, forwards or backwards, in the longitudinal direction of duct 201. Plunger 216 may be affixed to one end of the shaft and the linear motor may be positioned at the other end of the shaft.

Worm gear 218 may extend over the total length of duct 201 or, optionally, worm gear 218 may be part of a shaft extending over the entire length of duct 201. In the latter case, worm gear 218 covers at least the segment over which plunger 216 may be able to move within duct 201.

Plunger 216 may comprise a thread inside a concentrically positioned cylindrical tube, which meshes with worm gear 218. Plunger 216 may be inhibited from rotating, (due to frictional and inertial forces) by a stationary rod or cable 222, which is affixed inside duct 201, over its entire length, and may be positioned in a non-concentric, parallel to above mentioned worm gear 218. If, optionally, worm gear 218 is positioned in a non-concentric position inside duct 201, rod 222 may be redundant. Furthermore, if duct 201 is of non-cylindrical shape and thus, plunger 216 is of non-cylindrical shape, rod 222 is also redundant. It is noted here that in the above mentioned configuration, wherein plunger 216 is moved by means of a linear motor, rod 222 may also be redundant.

Plunger 216 moves in a longitudinal direction, forwards or backwards, in accordance with the spin direction of worm gear 218. Suitable leakage prevention sealing, such as gaskets, rings, and grease, are situated in the area of the thread and worm gear 218. For a more detailed illustration of stationary rod 222 and worm gear 218 and their respective accompanying parts, attention is directed further below to FIGS. 4, 5, 6A, and 6B.

Thus, a variable sized compartment 224 is formed by and enclosed by, duct 201, a stationary peripheral end 226 at one side and plunger 216 at the other side. Accordingly, suction force from vacuum suction force pump 202 enters compartment 224 through entrance port 205, and exits by any exit port that is at that time part of compartment 224.

As an example, in the temporary configuration or situation depicted in FIG. 2, plunger 216 is positioned between exit ports $P_2$ and $P_3$. Thus, any exit port located at the other side of plunger 216, such as $P_3$, $P_4$, or any other port until $P_n$, is effectively occluded. Accordingly, suction force is enabled for exit ports $P_1$ and $P_2$, by virtue of their being part of compartment 224 in this temporary configuration.

Those versed in the art will now readily appreciate the inherent simplicity of a vacuum distribution controller apparatus 200 directing suction force from one entrance port to one or more adjacent exit ports. As will be discussed further below, if suction force needs to be directed to more than areas of a vacuum table, these areas are commonly adjacent to each other.

Figure 3:
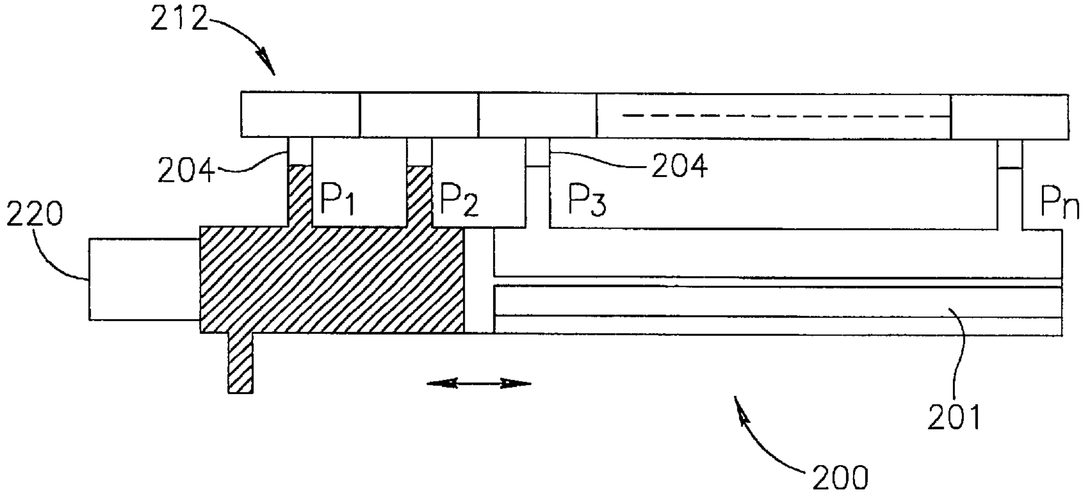
FIG. 3 is a schematic representation of the vacuum distribution controller, constructed and operated in accordance with another embodiment of the present invention.

Another embodiment of the present invention is shown in FIG. 3 to whom reference is now made. Exit ports $P_2$, $P_3$, $P_4$, . . . are directly coupled to associated suction inlet ports 204, substantially obviating the need for tubing 214. Design considerations may determine an altogether different spatial position or configuration.

Figure 4:
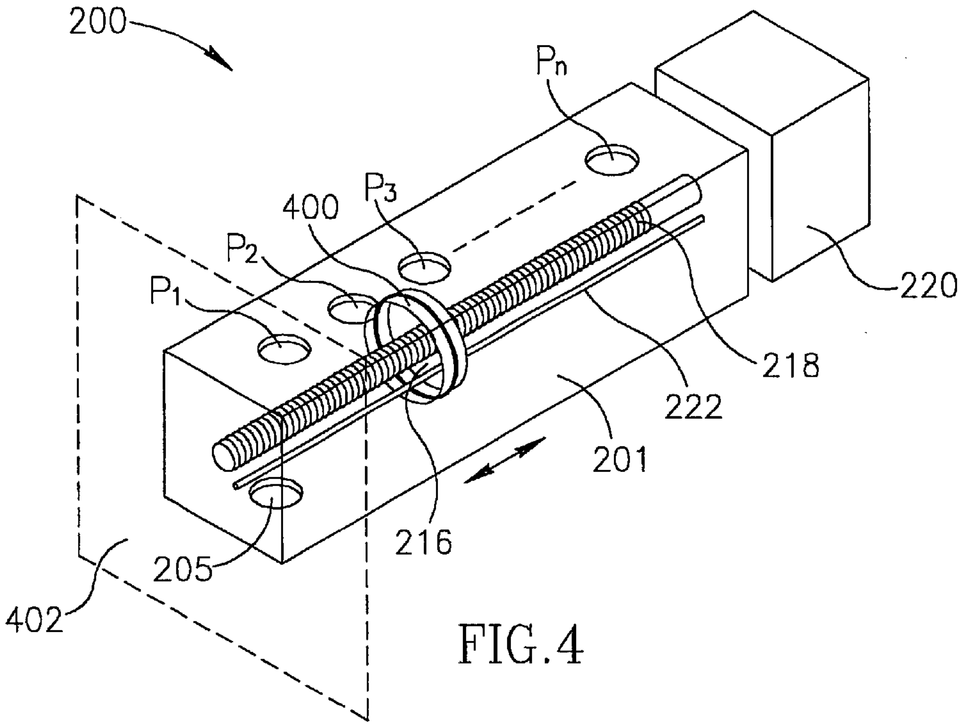
FIG. 4 is a perspective, more detailed schematic representation of the vacuum distribution controller.

FIG. 4 shows a perspective and more detailed schematic representation of the vacuum distribution controller apparatus 200 in accordance with one embodiment of the present invention.

Duct 201, part of a rectangular shaped housing, is shown in an elevated, sideways position. Thus, entrance port 205, a multitude of exit ports $P_1$, $P_2$, $P_3$ . . . $P_n$, plunger 216, stationary rod 222 and worm gear 218 are shown in their three-dimensional relative positions. As mentioned above, motor 220 may be positioned at a predetermined distance or/and angle from duct 201, depending on design considerations.

Plunger 216 is shown positioned in between exit ports $P_2$ and $P_3$, similar as the position shown in FIGS. 2 and 3. It should be mentioned here that plunger 216 in one maximal lateral position, directs suction force to all exit ports and consequently, to all respective coupled areas. The opposite, maximal lateral position prevents suction force to be directed to any exit port and thus inhibits suction force in all respective coupled areas.

In order to achieve a substantially entire fitting of plunger 216 inside duct 201, and alleviate above-mentioned lost of suction force, a spring-loaded ring 400 may be affixed to plunger 216. One or more peripheral trenches on plunger 216 may accommodate spring-loaded ring 400 and provide fixation in a manner substantially similar to the workings of piston rings in a motor combustion cylinder. It is noted that numerous other means of leakage prevention sealing, such as gaskets, rings, or grease, may be equally advantageously utilized for contributing to suction force confinement to compartment 224.

Figure 5:
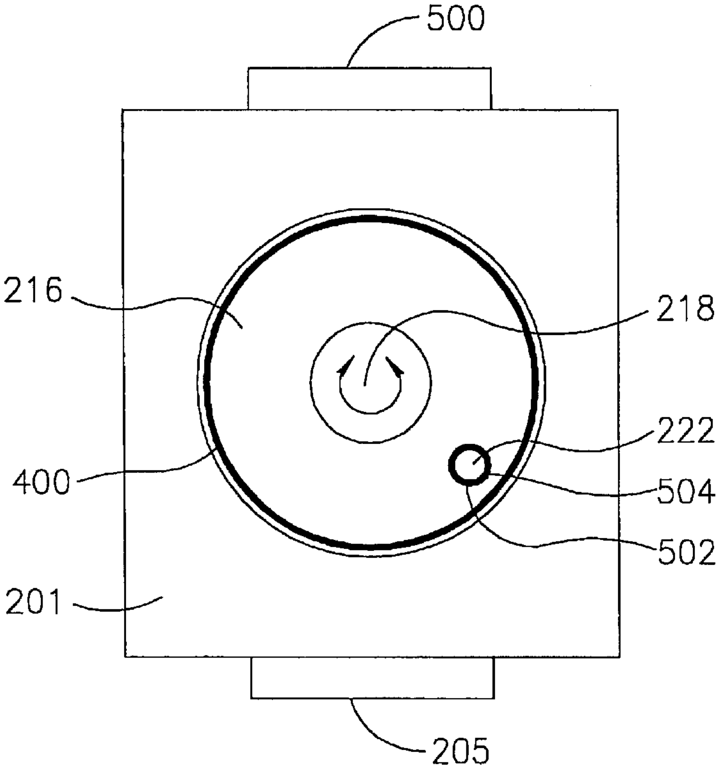
FIG. 5 is a frontal schematic representation of the vacuum distribution controller.

FIG. 5 shows a schematic cross-section from a frontal, longitudinal perspective of the area, as indicated in FIG. 4 by plane 402.

Entrance port 205 and an exit port 500 (PI in FIGS. 2, 3 and 4) are shown on the bottom and top of duct 201, respectively. Spring-loaded ring 400 seals the space between plunger 216 and duct 201. In a similar manner, one or more spring-loaded rings 504 are positioned inside hole 502, and seal the space between stationary rod 222 and hole 502 in plunger 216. As mentioned above, numerous sealing techniques may be utilized. Plunger 216, fitted on worm gear 218, inhibited from rotating by means of rod 222, moves forwards or backwards while worm gear 218 rotates by virtue of stationary rod 222, protruding through a hole 502 in plunger 216.

Figure 6A:
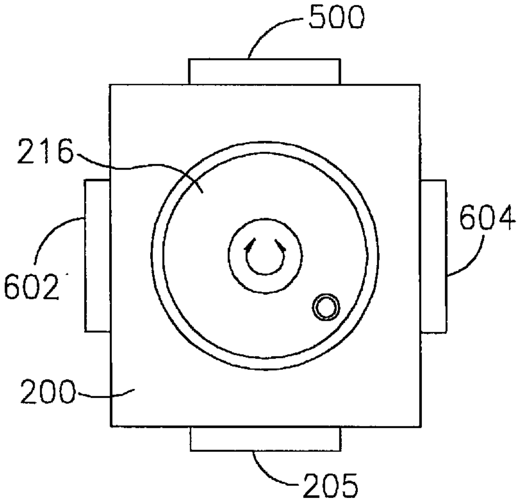
FIGS. 6A, 6B, and 6C are frontal schematic representations of the vacuum distribution controller having different configurations.

Yet another embodiment enables a multitude of exit port arrangements, as shown schematically in FIG. 6A. Entrance port 205, exit port 500, an exit port 602, an exit port 604, and any additional exit ports (not shown), may be positioned at predetermined positions in relation to each other. This may alleviate potential design restrictions or/and may offer other benefits, such as, inter alia, enabling shorter tubing, eliminating tubing, or facilitating other direct/indirect connections between exit ports and suction inlet ports.

Figure 6B:
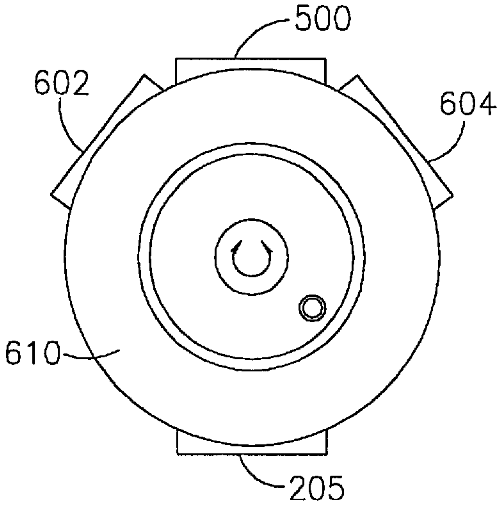

In another embodiment of the present invention, shown in FIG. 6B, duct 201 may have a cylindrical shape 610, enabling a multitude of predetermined angular positions for entrance port 205, exit port 500, 602, 604, and any additional exit ports (not shown) in relation to each other. Thus, benefits may be obtained, such as mentioned above with reference to FIG. 6A., addressing additional design restrictions.

Figure 6C:
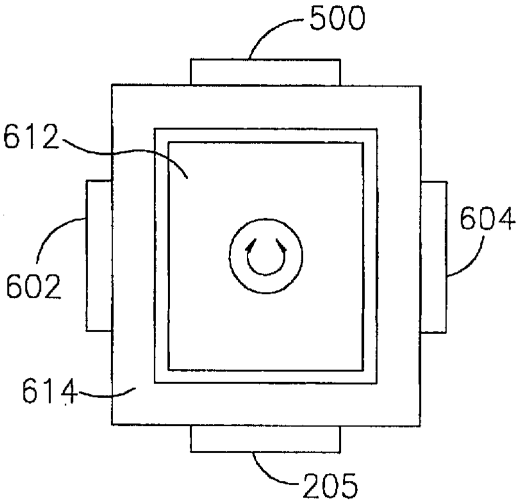

In yet another embodiment of the present invention shown in FIG. 6C, a rectangular plunger 612 is utilized, wherein a rectangular, duct 614 is the close-fitting sleeve. By virtue of its rectangular properties, plunger 612 is not able to rotate, therefore, no stationary rod (222 in FIG. 2) is necessary.

Those versed in the art will readily appreciate that in principle, no functional restrictions exist to the geometrical shapes of the plunger and the associated duct functioning as close-fitting sleeve. Therefore, FIG. 6C is only one possible example of a non-cylindrical configuration that may offer further benefits in design considerations and space confinement requirements.

It should be noted here that, for ease of understanding, only three out of a possible multitude of exit ports are depicted in FIGS. 4, 5, 6A, 6B and 6C.

Figure 1A:
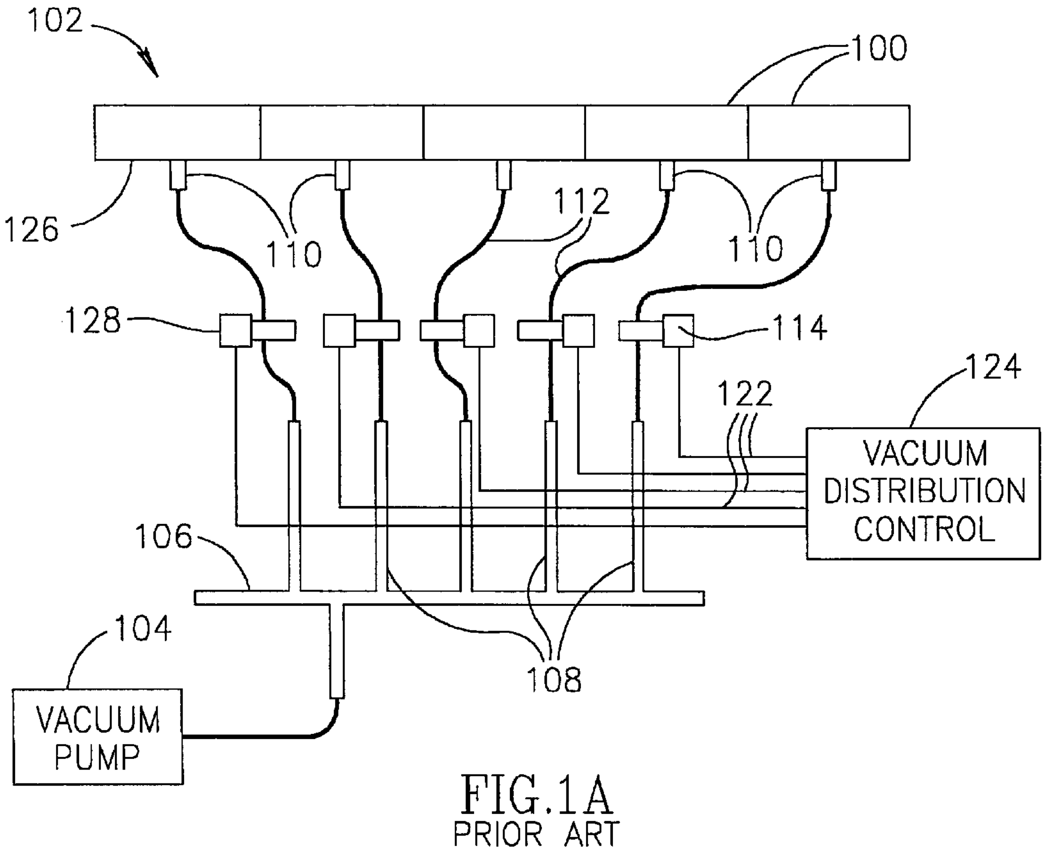
FIG.1A PRIOR ART
FIG. 1A is a schematic representation of a prior art vacuum table system configuration.
Figure 1B:
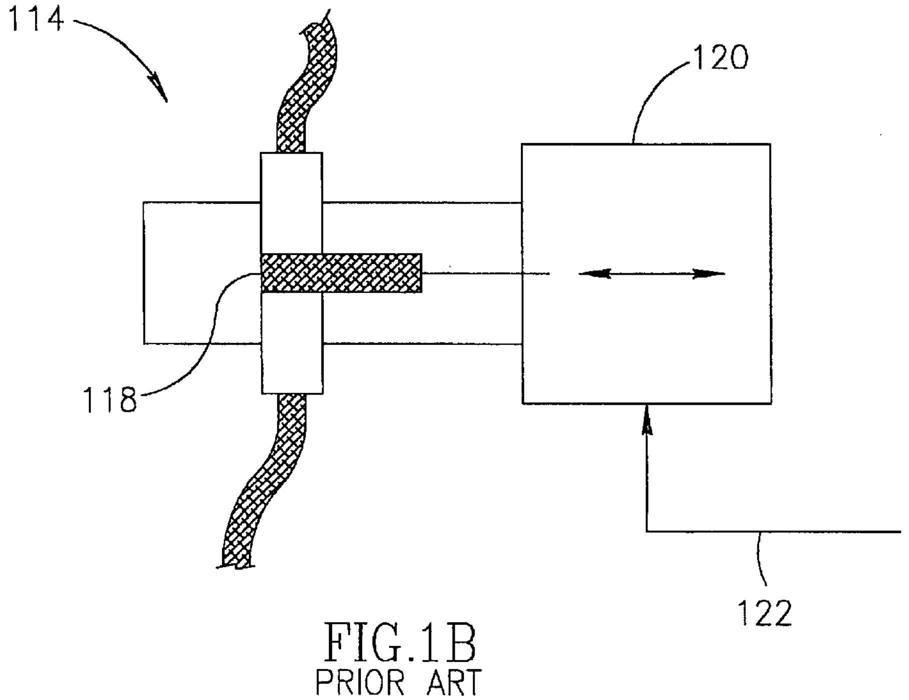
FIG.1B PRIOR ART
FIG. 1B is a schematic representation of a prior art single shut-off tap.
Figure 7:
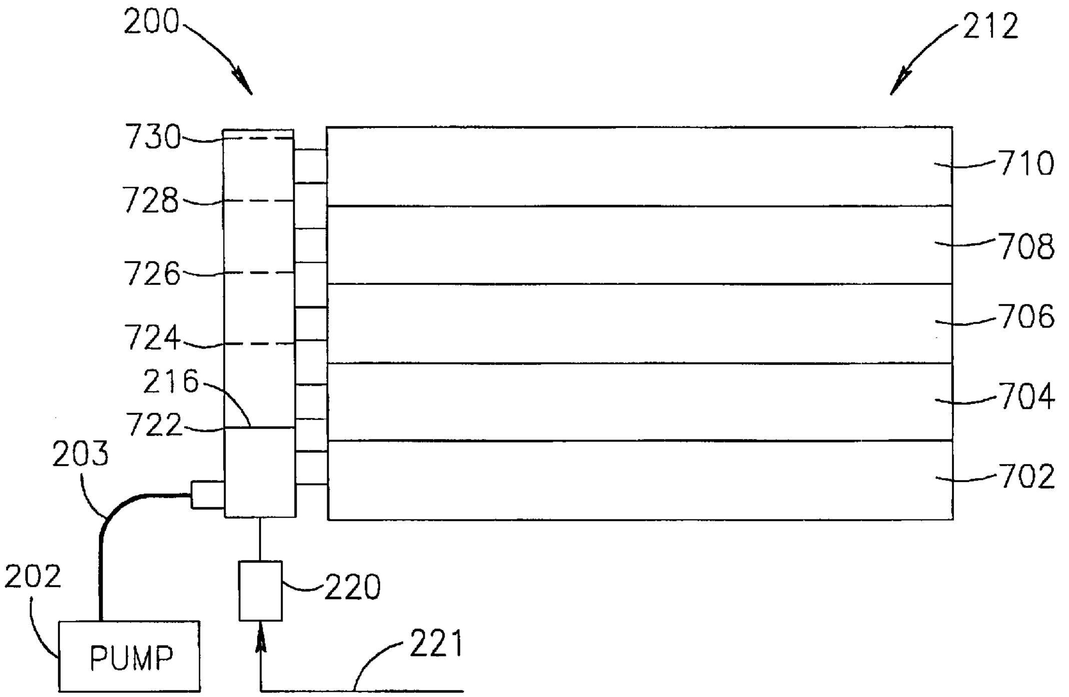
FIG. 7 is a schematic representation of the vacuum distribution controller in accordance with another embodiment of the present invention, utilizing a prior art vacuum table system.

FIG. 7 shows schematically a similar configuration to the prior art configuration described with reference to FIG. 1 and with reference to FIG. 3, one embodiment of the present invention.

It should be noted here that, in vacuum table applications, generally, a number of adjacent suction inlet ports, adjacent to each other, require vacuum suction. The present invention inherently addresses adjacency by virtue of above-mentioned compartment 224, discussed above with reference to FIG. 2.

Vacuum table 212 is divided into a predetermined number of horizontal areas 702, 704, 706, 708, and 710, to which suction force may be directed in an accumulative manner by positioning plunger 216 at positions 722, 724, 726, 728, or 730 respectively. As mentioned before, for ease of understanding, an illustrative configuration of 5 areas is discussed hereinafter. Those versed in the art will readily appreciate that any desired number of areas may be controlled in a similar manner.

Vacuum suction force pump 202 is coupled to vacuum distribution controller apparatus 200 of the present invention by means of suitable tubing 203. Plunger 216 is moved by motor 220, which receives positional electrical control signals 221 from a controller or a dedicated subsystem.

In the temporary configuration shown in FIG. 7, plunger 216 is in position 722, enabling suction force to horizontal area 702 only. Should a greater area than horizontal area 702 be needed to induce suction force to an object placed on vacuum table 212, a predetermined number of pulses with predetermined polarity are sent as control signal 221 to motor 220, causing worm gear 218 (FIG. 2) to rotate a predetermined number of rotations in the direction that will move plunger 216 into temporary position 724. Therefore, suction force is then applied to horizontal area 704 as well as to horizontal area 702.

In a similar manner, other temporary positions of plunger 216, such as, position 726, position 728, and position 730 will result in enlargement of the vacuum suction region to include, respectively, horizontal area 706, 708 and 710.

It should be noted that one of the many important advantages of the present invention is that as long as no change in vacuum suction regions is required, all mechanical and electrical systems are substantially in a state of rest. No energy, electrical or mechanical, is required to maintain a given, temporary configuration by virtue of absence of vacuum valves and their associated devices.

Those versed in the art will readily appreciate that the temporary configuration may be maintained for substantially long periods, emulating an invariable configuration, if so desired.

Figure 8:
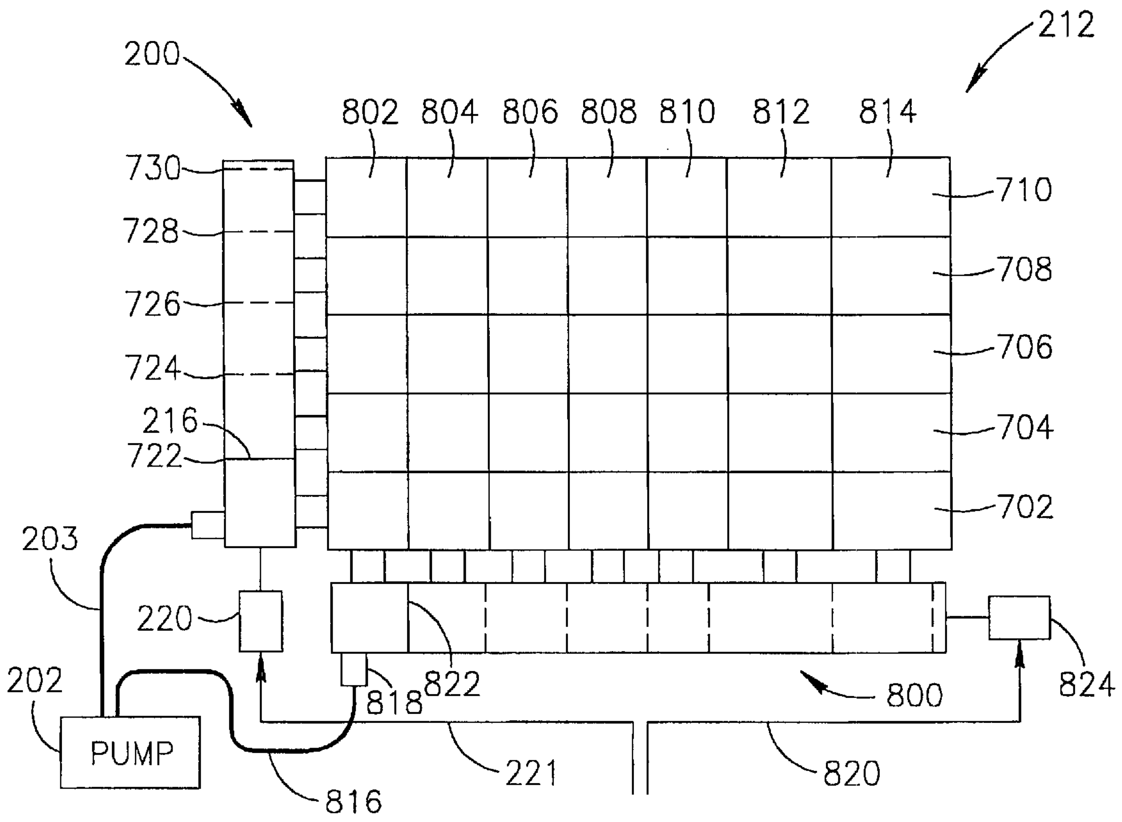
FIG. 8 is a schematic representation of the vacuum distribution controller in accordance with another embodiment of the present invention, utilizing a second vacuum distribution controller in accordance with the present invention.

With reference to FIG. 8, another embodiment is schematically shown, wherein vacuum table 212 is divided into vertical areas as well as into horizontal areas.

Vacuum table 212 comprises multiple horizontal areas 702–710 and multiple vertical areas 802–814. An additional vacuum distribution controller apparatus 800 of the present invention is positioned along a perpendicular side of vacuum table 212. Vacuum suction force pump 202 may be equipped with double suction force outlets to which suitable tubing 203 and 816 may be coupled. Optionally, a separate vacuum suction pump may be used. Tubing 816 may be coupled to an entrance port 818 of a second vacuum distribution controller apparatus 800. The second vacuum distribution controller apparatus 800 functions substantially identically to vacuum distribution controller apparatus 200. A control signal 820 may control movement and temporary position of a plunger 822 of second vacuum distribution controller apparatus 800 by means of a motor 824 or, optionally, motors 220 and 824 may both be responsive to the same control signals.

Thus, conform the area that is desired, suction force is directed to one or more adjacent horizontal areas, or to one or more adjacent vertical areas.

The present invention has been described with certain degree of particularity. Those versed in the art will readily appreciate that various modifications and alterations may be carried out without departing from the scope of the following claims:

What is claimed is:

1. A distribution controlling apparatus comprising:

a duct having an entrance port and one or more exit ports;

a plunger longitudinally movable within said duct such that said duct and said plunger form a variable sized compartment, said compartment comprising said entrance port and a variable number of said exit ports;

means for coupling said entrance port to a vacuum suction force pump; and means for coupling said at least one exit port to at least one suction inlet port of a vacuum table.

2. The apparatus in accordance with claim 1, wherein said means for coupling said at least one exit port comprises suitable tubing.

3. The apparatus in accordance with claim 1, wherein said at least one exit port is coupled directly to said at least one suction inlet port of said vacuum table.

4. The apparatus in accordance with claim 1 further comprising:

a worm gear coupled to a rotation device, said worm gear concentrically positioned within said duct.

5. The apparatus in accordance with claim 4, wherein said rotation device is a motor responsive to an electrical signal.

6. The apparatus in accordance with claim 4, wherein said rotation device is a stepper motor, responsive to electrical pulses.

7. The apparatus in accordance with claim 1, further comprising leakage prevention sealing means positioned between said plunger and said duct.

8. The apparatus in accordance with claim 1, wherein said duct is part of a cylindrical housing.

9. The apparatus in accordance with claim 1, wherein said duct is part of a rectangular housing.

10. The apparatus in accordance with claim 1, wherein said duct is cylindrical and said plunger is of cylindrical shape.

11. The apparatus in accordance with claim 4, further comprising:

a rod non-concentrically affixed inside said duct, said rod positioned parallel to said worm gear and said rod protruding through a non-concentric hole in said plunger.

12. The apparatus in accordance with claim 11, further comprising leakage prevention sealing means positioned between said plunger and said rod.

13. The apparatus in accordance with claim 1, wherein said duct is non-cylindrical and said plunger is of non-cylindrical shape.

14. An apparatus comprising:

a vacuum table having one or more inlet ports; and a vacuum distribution controller comprising:

a duct having an entrance port coupled to a vacuum pump and at least one exit port coupled to said one or more inlet ports of said vacuum table; and a plunger longitudinally movable within said duct such that said duct and said plunger form a variable sized compartment, said compartment comprising said entrance port and a variable number of said exit ports.

* * * * *